(12) United States Patent
Forsberg

(10) Patent No.: US 6,940,949 B2
(45) Date of Patent: Sep. 6, 2005

(54) RING, TIP, GROUND TESTING TOOL

(75) Inventor: Kevin Forsberg, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 172 days.

(21) Appl. No.: 10/282,564

(22) Filed: Oct. 29, 2002

(65) Prior Publication Data
US 2004/0109540 A1 Jun. 10, 2004

(51) Int. Cl.[7] .......................... H04M 1/24; H04M 3/08; H04M 3/22
(52) U.S. Cl. .................. 379/21; 379/22.03; 379/27.01; 324/509
(58) Field of Search ...................... 379/1.01, 21, 22.03, 379/22.07, 24, 27.01, 27.06, 29.02, 22.06, 29.05, 32.01; 324/509, 510, 522, 525, 539

(56) References Cited

U.S. PATENT DOCUMENTS

| | | | | |
|---|---|---|---|---|
| 3,704,347 A | * | 11/1972 | Brown | 379/21 |
| 3,792,205 A | * | 2/1974 | O'Dea | 379/21 |
| 3,975,600 A | * | 8/1976 | Marston | 379/21 |
| 4,022,987 A | * | 5/1977 | O'Dea | 379/27.08 |
| 4,159,402 A | * | 6/1979 | De Graauw et al. | 379/12 |
| 4,186,283 A | * | 1/1980 | Simmonds | 379/21 |
| RE31,728 E | * | 11/1984 | Simmonds | 379/21 |
| 5,123,041 A | * | 6/1992 | Brinkmoeller | 379/21 |
| 5,218,616 A | * | 6/1993 | Stephens | 379/29.05 |
| 5,754,624 A | * | 5/1998 | Sullivan et al. | 379/27.01 |
| 5,933,011 A | * | 8/1999 | Atkins | 324/509 |
| 5,960,060 A | * | 9/1999 | Kaibel | 379/21 |
| 6,438,212 B1 | * | 8/2002 | Lysaght et al. | 379/21 |
| 6,614,880 B1 | * | 9/2003 | Lysaght et al. | 379/21 |

* cited by examiner

Primary Examiner—Binh K. Tieu
(74) Attorney, Agent, or Firm—Walters & Zimmerman; Jennifer Medlin; Todd Mitchem

(57) ABSTRACT

An apparatus and a method for determining faults in a telephone line. The apparatus has an enclosure housing a switch. The switch is for electrically communicating with a ring wire of a telephone line, with a tip wire of the telephone line, and with an electrical ground. The switch selectively permits electrical communication between any two of the ring wire, the tip wire, and the ground. The apparatus improves testing of the telephone line by helping identify an electrically open condition in the telephone line.

9 Claims, 4 Drawing Sheets

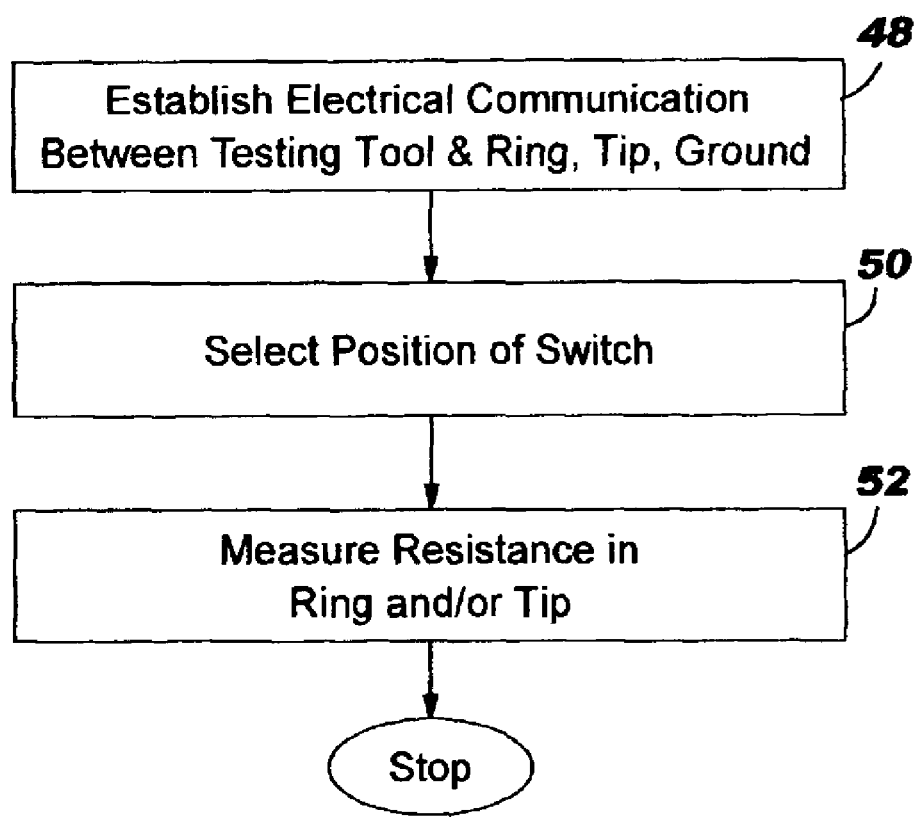

RING, TIP, GROUND TESTING TOOL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to telephony and, more particularly, to testing of telephone lines for electrical faults.

2. Description of the Related Art

Telephone customers sometimes experience static on their telephone line. Static in a may be caused by corrosion, condensation, or even a break in the telephone line. Static may also be caused by a loose connection between the telephone line and a telephone. Whatever the causes of static, nearly sixty percent (60%) of customer complaints in some areas are due to static in the telephone lines.

Resolving customer complaints of static can be frustrating for telephone technicians. Ambient temperatures, for example, can mask a problem with a customer's telephone line. Sometimes the copper core of a telephone line is only partially cut, creating a "high resistance open" condition. That is, there is a connection at the cut, but the connection is dependent upon the ambient temperature. As the telephone line heats up during the day, the copper core expands and maintains a good connection. When night falls, the copper core cools, shrinks, and causes static on the telephone line. When the technician tests the telephone line during the day, the expanded copper core passes a good dial tone and the technician finds no trouble. The customer, however, still experiences static at night, so another technician is dispatched to repair the same complaint.

This complaint process continues until one or more later technicians suspect a high resistance open condition. Because the telephone line heats and expands during the day, an experienced technician will spray the telephone line with water from a hose. The water eventually cools the telephone line, causing the copper core to shrink. When the technician now tests the telephone line, the partially cut copper core is revealed as a high resistance on the telephone line, indicating an open condition. Although the technician has finally discovered the problem, two hours or more have been spent before the technician even begins a repair.

There is, accordingly, a need in the art for improved testing of telephone lines, a need for determining the causes of static in a telephone line, a need for quickly determining whether a high resistance open condition exists on a telephone line, and a need for improved testing of telephone lines that reduces labor times.

BRIEF SUMMARY OF THE INVENTION

These and other problems are reduced by an apparatus and a method that helps determine problems with a telephone line. This invention quickly and simply attaches to the telephone line and allows a person to quickly determine whether an open condition exists with the telephone line. One embodiment of this invention describes an apparatus for determining faults in a telephone line. The apparatus has an enclosure housing a switch. The switch is for electrically communicating with a ring wire of a telephone line, with a tip wire of the telephone line, and with an electrical ground. The switch selectively permits electrical communication between any two of the ring wire, the tip wire, and the ground. The apparatus improves testing of the telephone line by helping identify an electrically open condition in the telephone line. The terms "electrical communication," "electrically communicates," and "electrically communicating" all mean the transmission of current and voltage between the switch and the ring wire, the tip wire, and the electrical ground. Electrical communication is commonly achieved when the switch makes electrical contact with the ring wire, the tip wire, and the electrical ground, thus allowing current and voltage to flow. Electrical communication, however, is also possible by electromagnetic induction.

Another embodiment of this invention describes a method for determining faults in the telephone line. Electrical communication is established between a testing tool and a ring wire of a telephone line, a tip wire of the telephone line, and an electrical ground. The testing tool comprises an enclosure housing a switch. A position of the switch is selected to establish electrical communication between any two of the ring wire, the tip wire, and the ground. When electrical communication is established, a resistance is measured in at least one of the ring wire, the tip wire, and the ground. The measured resistance helps determine whether a fault is present in the telephone line.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein:

FIG. 4 is a flowchart illustrating a method for determining faults in a telephone line according to an embodiment of this invention.

DETAILED DESCRIPTION OF THE INVENTION

Figure 1:
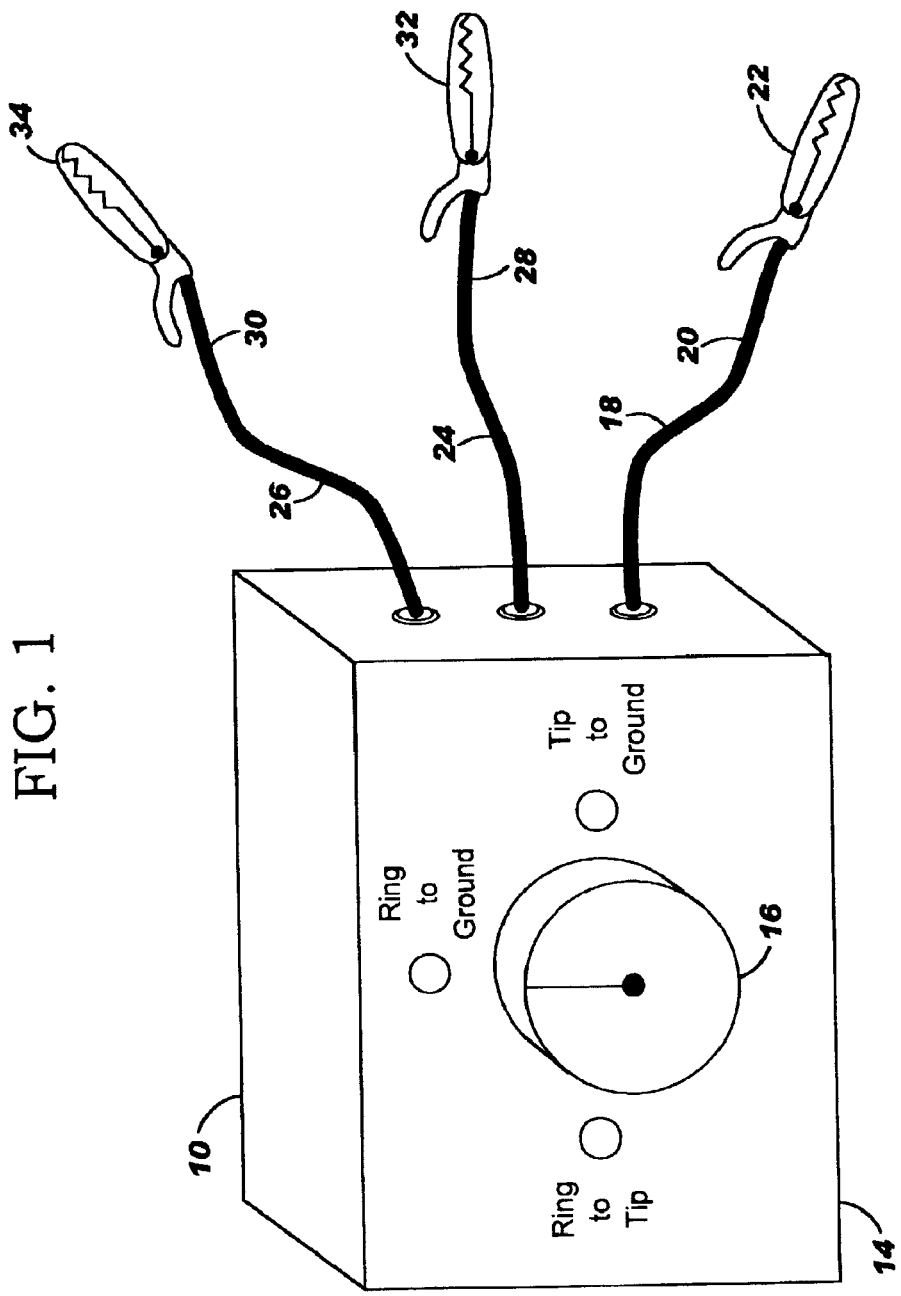
FIGS. 1 and 2 are isometric drawings of a testing tool 10 according to an embodiment of this invention.
Figure 2:
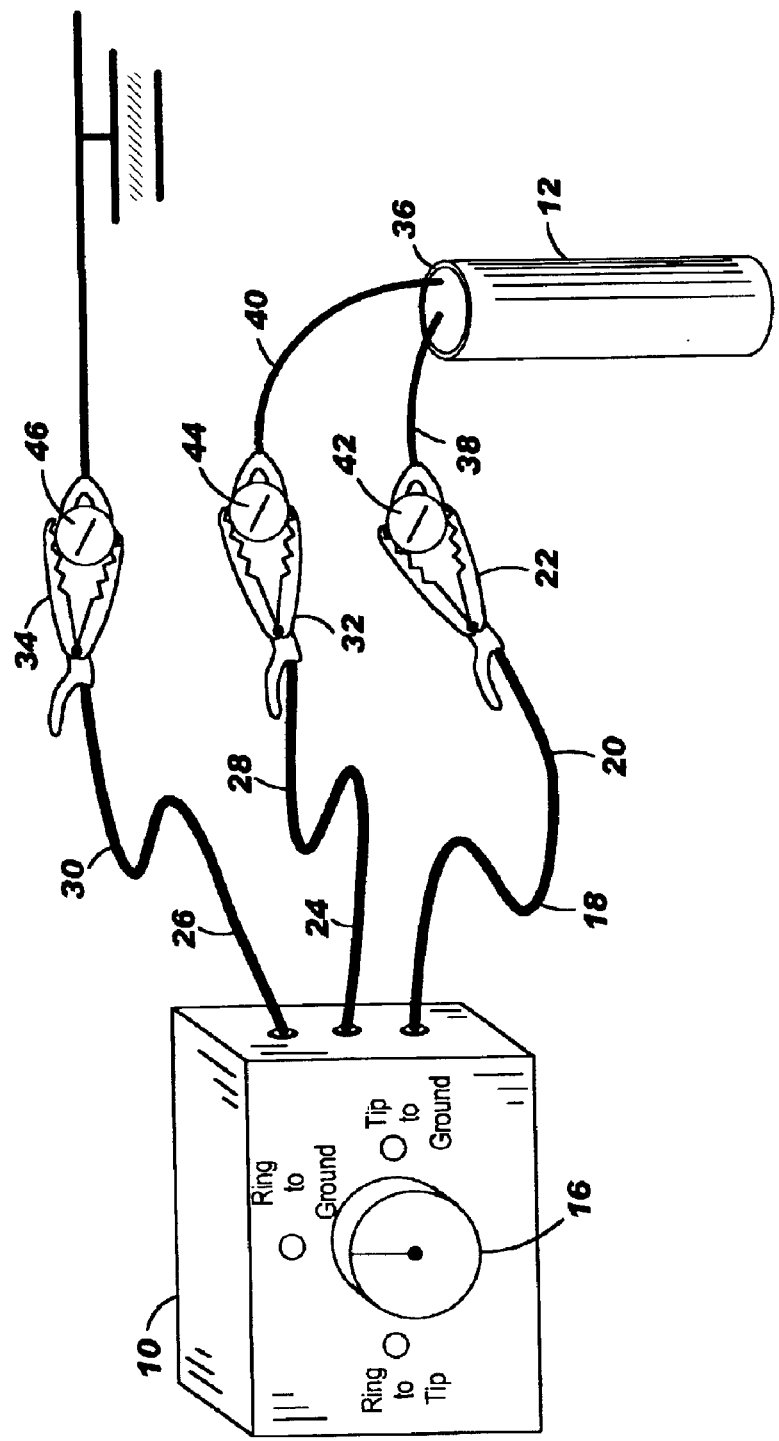

FIGS. 1 and 2 are isometric drawings of a testing tool 10 according to this invention. FIG. 1 shows the testing tool 10, while FIG. 2 shows the testing too 10 connected to a telephone line 12. As FIG. 1 shows, the testing tool 10 comprises an enclosure 14 housing a switch 16. The switch 16 electrically communicates with at least one of at least three terminals. A first terminal 18 is shown as a wire conductor 20 and an adjustable clip 22. The wire conductor 20 communicates current and voltage from the adjustable clip 22 to the switch 16. A second terminal 24 and a third terminal 26, likewise, also include respective wire conductors 28, 30 and adjustable clips 32, 34 to communicate current and voltage to the switch 16.

FIG. 2 shows the testing tool 10 connected to the telephone line 12. Because the testing tool 10 may be used throughout a telecommunications network, FIG. 2 simply conveys a generic connection to the telephone line 12. The telephone line 12 has an outer jacket 36 shielding a ring wire 38 and a tip wire 40. The ring wire 38 runs from the central office (not shown) of the telecommunications network (not shown). The ring wire 38 typically connects to a telephone (not shown) and transmits signals from the central office to the telephone. The tip wire 40 completes the electrical loop by returning signals from the telephone to the central office. The ring wire 38 and the tip wire 40 are the typical copper telephone lines running throughout many homes and businesses.

FIG. 2 shows the testing tool 10 connected to the telephone line 12. The ring wire 38, for example, is clamped to a ring wire screw terminal 42. The adjustable clip 22 of the first terminal 18 is also clamped to the ring wire screw terminal 42. The first terminal 18 then electrically communicates with the ring wire 38 of the telephone line 12. Any current and voltage in the ring wire 38 is electrically communicated from the adjustable clip 22, through the wire conductor 20, and to the switch 16. The tip wire 40 is clamped to a tip wire screw terminal 44, and the adjustable clip 32 of the second terminal 24 is also clamped to the tip wire screw terminal 44. The second terminal 24 electrically communicates with the tip wire 40. Any current and voltage in the tip wire 40 is electrically communicated from the adjustable clip 32, through the wire conductor 28, and to the switch 16.

FIG. 2 also shows the testing tool 10 connected to electrical ground. The third terminal 26 is grounded. The third terminal 26 electrically communicates with the electrical ground when the adjustable clip 34 is clamped to a grounded screw terminal 46.

The switch 16 has at least three (3) positions. A first position permits electrical communication between the ring wire 38 and the electrical ground (such as the grounded screw terminal 46). A second position permits electrical communication between the tip wire 40 and the electrical ground. A third position permits electrical communication between the ring wire 38 and the tip wire 40. Although the switch 16 is shown as a rotary switch, the switch 16 may be any design that permits electrical communication between any two of the ring wire 38, the tip wire 40, and the electrical ground. Rotary switches, rocker switches, toggle switches, and slide switches are but a small listing of the various switch designs that are applicable to this invention.

Use of the testing tool 10 will now be explained. The testing tool 10 is connected to the telephone line 12 and used to detect a high resistance open condition. Although the testing tool 10 may be used throughout the telecommunications network, this explanation will assume the testing tool 10 is connected to an Outside Network Interface (not shown). The Outside Network Interface is the point of connection between the customer's premises and a Public Switched Telephone Network. The Outside Network Interface often demarcates the physical and electrical boundary between the customer's premises and the telecommunications network. Most people know the Outside Network Interface as the "phone box" on the side of a house. The telephone line 12 typically runs from a telephone pole, to the house, and into the Outside Network Interface (or phone box). Although the testing tool 10 could be connected to other network elements in the telecommunications network, a connection to the Outside Network Interface is most commonly envisioned by the inventor.

FIG. 2 also represents a connection to the Outside Network Interface. The Outside Network Interface has the ring wire screw terminal 42, the tip wire screw terminal 44, and the grounded screw terminal 46. The ring wire 38 is clamped to the ring wire screw terminal 42 and the tip wire 40 is clamped to the tip wire screw terminal 44. The adjustable clip 22 of the first terminal 18 is clamped to the ring wire screw terminal 42, and the adjustable clip 32 of the second terminal 24 is clamped to the tip wire screw terminal 44. The adjustable clip 34 of the third terminal 26 is clamped to the grounded screw terminal 46. The testing tool 10 is thus connected to the ring wire 38 and the tip wire 40 of the telephone line 12, and the testing tool 10 is thus connected to electrical ground.

The testing tool 10 cleverly allows a person to test the telephone line 12 for a high resistance open condition. When, for example, the core of the telephone line 12 is only partially cut, the telephone line 12 will frequently test perfect. If, however, either the ring wire 38 or the tip wire 40 is shorted to electrical ground, a resistance measurement on either line will indicate the presence of the open condition. When the ring wire 38, for example, is shorted to electrical ground, creating a "hard short" on the ring wire 38, an only slightly shorted resistance measurement indicates a problem. The term "hard short" means two wires, such as the ring wire 38 and the grounded third terminal 26, are directly connected. Direct continuity is what's desired when one line, such as the ring wire 38 or the tip wire 40, is shorted to electrical ground. Because a hard short should read zero ohms (0 $\Omega$), a resistance measurement of twenty or thirty ohms (20 $\Omega$ or 30 $\Omega$), indicates something is wrong. The resistance measurement should be zero, one, or two ohms (0 $\Omega$, 1 $\Omega$, or 2 $\Omega$), reflecting the hard short. This procedure, of applying a hard short and measuring the resistance on the line, applies to either the ring wire 38 or the tip wire 40. A person tests either the ring wire 38 or the tip wire 40 (e.g., just one side of the telephone line 12) and tries to isolate which side (or both ring wire 38 and the tip wire 40) has the high resistance open.

Now that the basic principles of this invention have been explained, a more detailed use of the testing tool 10 is now described. The testing tool 10, as described above, is connected to the telephone line 12. The switch 16 is set to either of its three (3) positions, permitting electrical communication between any two of the ring wire, the tip wire, and the ground. The switch 16 thus electrically shorts any two of the ring wire, the tip wire, and the ground. While the switch 16 may be set to either position, this explanation will start with the switch 16 set to the third position for permitting electrical communication between the ring wire 38 and the tip wire 40.

The third position of the switch 16 electrically shorts the ring wire 38 to the tip wire 40. Once the switch 16 is set to the third position, the person performing the test then travels to the other opposite end of the telephone line 12 and measures the resistance on the ring wire 38 and the tip wire 40. If, for example, the telephone line 12 runs from a telephone pole to a house, the person travels to the telephone pole and takes resistance measurements. Because the switch 16 is set to the third position, thus electrically shorting the ring wire 38 to the tip wire 40, the resistance measurement should read zero to perhaps seven ohms (0 $\Omega$–7 $\Omega$). If the high resistance open condition is located very close to the testing tool 10 creating the electrical short, the resistance measurement should be about zero ohms (0 $\Omega$). If the high resistance open condition is located about 1,200 to about 1,500 feet from the testing tool 10, the resistance measurement should be about zero to about three ohms (0 $\Omega$–3 $\Omega$). If the high resistance open condition is located about 5,000 feet from the testing tool 10, the resistance measurement should be about seven to about ten ohms (7 $\Omega$–10 $\Omega$). When, however, the hard short is applied, and the resistance measurement is about thirty to about forty ohms (30 $\Omega$–40 $\Omega$), something is wrong. The resistance measurement should indicate the presence of the hard short, but a moderate short is, instead, measured. This moderate short indicates a high resistance open is somewhere in the telephone line 12.

Now that the moderate short is detected, the testing tool 10 is used to further isolate the high resistance open condition. The testing tool 10 is then set to the first position. The first position permits electrical communication between the ring wire 38 and the electrical ground, thus shorting the ring wire 38. The person performing the test travels to the other opposite end of the telephone line 12 and measures the resistance on the ring wire 38. The resistance measurement, as before, should read zero to perhaps seven ohms (0 Ω–7 Ω), reflecting the hard short. If, however, the resistance measurement is about thirty to about forty ohms (30 Ω–40 Ω), this moderate short indicates a high resistance open is somewhere in the ring wire 38.

The testing tool 10 is also used to test the tip wire 40. The testing tool 10 is set to the second position. The second position permits electrical communication between the tip wire 40 and the electrical ground, thus shorting the tip wire 40. The person performing the test travels to the other opposite end of the telephone line 12 and measures the resistance on the tip wire 40. The resistance measurement, as before, should read zero to perhaps seven ohms (0 Ω–Ω), reflecting the hard short. If, however, the resistance measurement is about thirty to about forty ohms (30 Ω–40 Ω), this moderate short indicates a high resistance open is somewhere in the tip wire 40.

The testing tool 10 also helps determine when the trouble lies in another portion of the telephone line 12. When the testing tool 10 applies the hard short, and the resistance measurement indicates zero ohms (0 Ω), this portion of the telephone line 12 is good. That is, in this example, no high resistance open condition occurs in the telephone line 12 running from the telephone pole to the house. The testing tool 10 would be removed from the Outside Network Interface and installed in another portion of the loop. Other portions of the loop would be tested to find the high resistance open, short, or grounded condition.

Figure 3A:
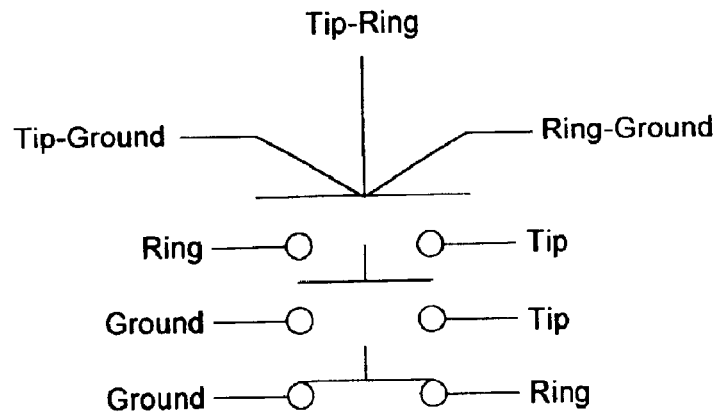
FIG. 3 is a series of schematics illustrating the operation of the switch 16 shown in FIGS. 1 and 2.
Figure 3B:
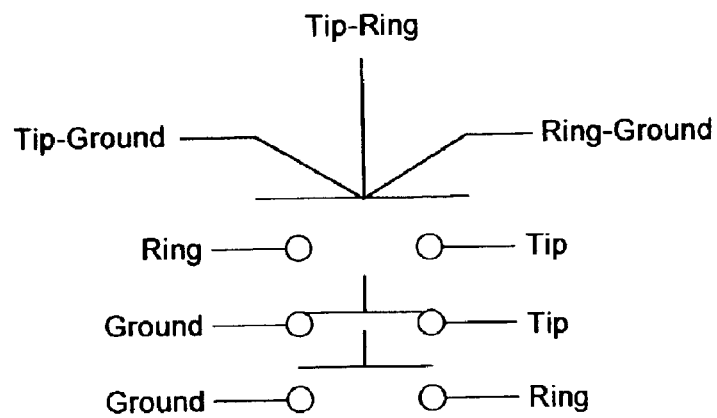
Figure 3C:
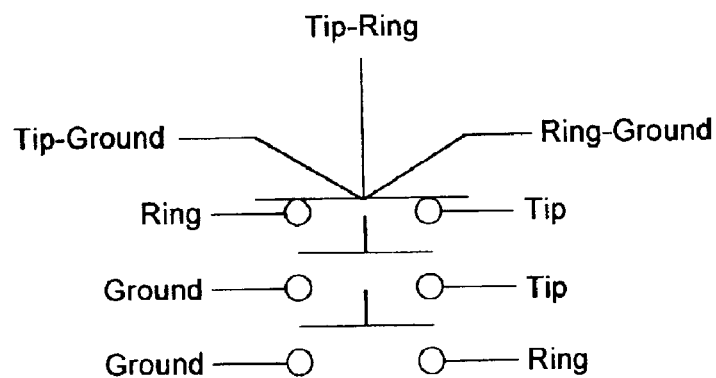

FIG. 3 is a series of schematics illustrating the operation of the switch 16. FIG. 3A illustrates the first position of the switch 16. This first position creates a shorted, direct connection between the ring wire 38 and electrical ground, thus permitting electrical communication between the ring wire 38 and the electrical ground. FIG. 3B illustrates the second position of the switch 16. This second position, likewise, creates a shorted condition between the tip wire 40 and electrical ground, thus permitting electrical communication between the ring wire 40 and the electrical ground. FIG. 3C illustrates the third position of the switch 16 that permits electrical communication between the ring wire 38 and the tip wire 40, thus shorting the ring wire 38 to the tip wire 40.

FIG. 4 is a flowchart illustrating a method for determining faults in a telephone line. An electrical communication is established between a testing tool and a ring wire, a tip wire, and grounded electrical (Block 48). A position of a switch is selected (Block 50) to establish electrical communication between any two of the ring wire, the tip wire, and the electrical ground. A resistance is measured (Block 52) in at least one of the ring wire, the tip wire, and the electrical ground. The measured resistance identifies whether a fault is present in the telephone line.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus, comprising:
   an enclosure housing a switch, the switch having three poles, a first pole connected to a ring wire of a telephone line, a second pole connected to a tip wire of the telephone line, and a third pole connected to a ground;
   the switch having three positions that selectively permit electrical communication between any two of the ring wire, the tip wire, and the ground,
   wherein the apparatus improves testing of the telephone line by helping identify an electrically open condition in the telephone line.

2. An apparatus according to claim 1, further comprising a first terminal in electrical communication with the switch, the first terminal for electrically communicating with the ring wire of the telephone line.

3. An apparatus according to claim 1, further comprising a second terminal in electrical communication with the switch, the second terminal for electrically communicating with the tip wire of the telephone line.

4. An apparatus according to claim 1, further comprising a third terminal in electrical communication with the switch, the third terminal for electrically communicating with the ground.

5. An apparatus according to claim 1, wherein the switch has a first position for directly connecting the ring wire to the ground.

6. An apparatus according to claim 1, wherein the switch has a second position directly connecting the tip wire to the ground.

7. An apparatus according to claim 1, wherein the switch has a third position directly connecting the ring wire to the tip wire.

8. A method, comprising:
   establishing electrical communication between a testing cool and a ring wire of a telephone line, a tip wire of the telephone line, and a ground, the testing tool comprising an enclosure housing a switch, the switch having a first pole connected to the ring wire, a second pole connected to the tip wire, and a third pole connected to the ground;
   selecting one of three positions of the switch to establish electrical communication between any two of the ring wire, the tip wire, and the ground, such that the switch has a first position that electrically connects the first pole and the second pole, a second position that electrically connects the first pole and the third pole, and a third position that electrically connects the second pole and the third pole; and
   measuring a resistance in at least one of the ring wire, the tap wire, and the ground,
   wherein the measured resistance indicates whether a fault is present in the telephone line.

9. An apparatus, comprising:
   an enclosure housing a switch, the switch having a first pole, a second pole, and a third pole, the first pole directly connecting to a ring wire of a telephone line, the second pole directly connecting to a tip wire of the telephone line, and the third pole directly connecting to an electrical ground;
   the switch having a first position that electrically connects the first pole to the second pole;
   the switch having a second position that electrically connects the first pole to the third pole; and
   the switch having a third position that electrically connects the second pole to the third pole,
   wherein the apparatus improves testing of the telephone line by helping identify an electrically open condition in the telephone line.

* * * * *